Patented Mar. 6, 1928.

1,661,618

UNITED STATES PATENT OFFICE.

GEORG MUTH, OF NUREMBERG, GERMANY.

PROCESS FOR MAKING ALUMINUM COMPOUNDS.

No Drawing. Application filed March 29, 1921, Serial No. 456,751, and in Germany May 13, 1919.
Renewed March 24, 1923.

This invention relates to the making of sulphate of aluminum from aluminum bearing materials, such as clay, and its object is to devise such a process wherein the clay can be used in its natural (uncalcined) state.

The invention consists generally in the provision of a method of making sulphate of aluminum from aluminum oxide bearing materials (such as china clay) wherein by the addition of a chemical intermediary, a decomposition acid will act upon the clay through the medium of the chemical intermediary whereby a cyclic action is produced.

To describe the process in more detail, I use clay sulphuric acid and a fluoride, wherein the acid acts upon the fluoride to produce hydrofluoric acid whereupon the hydrofluoric acid acts upon the clay to form aluminum fluoride which in turn with excess sulphuric acid forms aluminum sulphate. I find that if I use proper relative amounts of each substance I get the following reactions:

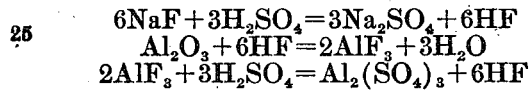

In other words, the sulphuric acid acts upon the fluoride to produce hydrofluoric acid, the hydrofluoric acid then acts upon the aluminum oxide of the clay to produce aluminum fluoride and the excess sulphuric acid acts upon the aluminum fluoride to produce sulphate of aluminum and more hydrofluoric acid. This generated hydrofluoric acid acts on any remaining clay and the process repeats as long as there is enough uncombined clay and sulphuric acid present wherein I have evolved a process for making sulphate of aluminum from unburned china clay which may be said to be cyclic, or regenerative. My invention, therefore, resides in the use of a fluoride as an intermediary chemical between the clay and the decomposing acid, with the ingredients used in such relative proportions as to make the process cyclic or regenerative.

Whereas, I have referred to the use of sulphuric acid it is to be understood that I may substitute therefor sodium bisulphate; and for the fluoride I may substitute sodium fluoride, calcium fluoride, or other fluorides which produce hydrofluoric acid when treated with sulphuric acid such as fluosilicates and the like (as cryolite).

As one example embodying my invention I give:—To 200 parts of cold sulphuric acid of about 40° Bé. or to a corresponding quantity of sodium bisulphate solution of about the same strength, I add 100 parts of pulverized unburned clay or other aluminum bearing material, and 5 or less parts of pulverized fluospar. This is mixed in a vessel by stirring and to facilitate the reaction, the vessel may be heated.

As stated, the freed hydrofluoric acid acts upon the aluminum oxide to form aluminum fluoride which fluoride is easily decomposed by the sulphuric acid present into sulphate of aluminum, and hydrofluoric acid is thereupon regenerated whereupon it forms with the additional amount of aluminum oxide an additional amount of sulphate of aluminum. However, on account of the volatility of the hydrofluoric acid, this process cannot be carried out ad infinitum in open vessels because after a while all the hydrofluoric acid will become evaporated leaving some uncombined sulphuric acid and consequently some unchanged clay in the product resulting from the process. The products obtained from the above example are partly in liquid form, sulphate of aluminum and some sulphuric acid, and partly solid, some unchanged clay and colloidal silica.

The presence of the acid is undesirable commercially, so it has to be neutralized in a suitable manner. The selection of the neutralizing agent depends largely on what the products, resulting from the process, are to be used for. In the paper industry, for instance, where the sulphate of aluminum and the solid products of the reaction are used simultaneously, that is without being separated from each other, a neutralizing agent is taken which with the sulphuric acid will form either a soluble or an insoluble compound, desirable in the manufacture of paper. For instance, the basic compounds of the metals of the magnesium or aluminum groups, or mixtures of both. Such substances may be caustic magnesia, magnesium carbonate, minerals containing these substances, as for instance magnesite, aluminates, aluminum hydroxide, burnt clay and the like. If the object of the process is the pure sulphate of aluminum, then aluminum compounds are taken as neutralizing agents whereby such neutralizing agents with the excess sulphuric acid form some more sulphate of aluminum.

The liquid sulphate of aluminum can easily be separated from the solid reaction product by filtration, decantation, etc. I find that the colloidal silica, contained in the solid product, makes the latter particularly valuable for paper making.

Remembering that the fundamental feature of this invention is the regeneration of hydrofluoric acid and the decomposing reaction of the hydrofluoric acid, in statu nascendi, on the clay whereby a cyclic reaction is obtained, the neutralization step necessary in the above example may be obviated where such is desired by any method wherein the hydrofluoric acid is prevented from evaporating or otherwise escaping; so to that end instead of carrying out the above process in an open vessel, I carry it out in a closed vessel. I find that the cyclic action of the process is prolonged until there is no sulphuric acid left with the two-fold result that a greater yield of sulphate of aluminum results and the resulting reaction product is already neutral and accordingly needs no neutralizing step. Moreover, I find that if the reaction is carried out in a closed vessel and a pressure above atmospheric is used, the process is not only accelerated but is more efficient. For instance, if 100 kgs. of clay of about 40% alumina are treated with 250 kgs. of sulphuric acid of 40° Bé. and 5 kgs. of fluospar at a pressure of 2 to 3 atmospheres in a closed vessel (preferably provided with a stirring device) a neutral product is obtained in about two hours.

However, I want to make it clear that there is no fundamental difference between the open and closed vessel process for in the open vessel some hydrofluoric acid escapes leaving the resulting product acid in reaction which must be neutralized whereas in the closed vessel no hydrofluoric acid escapes and all of the sulphuric acid is combined leaving the product neutral. The resulting product in either case is excellent for use wherever sulphate of aluminum is used but the colloidal silica in the product either in the product or separated therefrom is highly desirable in paper making when used as a filler. The same is also true of what uncombined clay remains in the reaction product.

What I claim as my invention is:

1. The method of producing sulphate of aluminum which consists in exposing unburned clay to a decomposing acid in the presence of an intermediary chemical while preventing the evaporation of the intermediary chemical, whereby the acid decomposes the chemical and the decomposition product in turn decomposes the clay with resultant formation of fresh intermediary chemical and these decomposing steps become cyclic.

2. The process of obtaining soluble aluminum salts from aluminum bearing mineral which consists in treating a water insoluble aluminum bearing mineral decomposable by hydrofluosilicic or hydrofluoric acid with a fluorine salt in the presence of an acid decomposing the fluorine salt to form a fluorine acid which causes decomposition of aluminum bearing mineral, the treatment being carried out not above the boiling point of the batch.

3. The process of obtaining soluble aluminum salts from aluminum bearing mineral which consists in treating a water insoluble aluminum bearing mineral decomposable by hydrofluosilicic or hydrofluoric acid, with a fluorine salt in the presence of an acid decomposing the fluorine salt to form a fluorine acid which causes decomposition of aluminum bearing mineral and the formation of an aluminum salt of the said acid, the treatment being carried out in water solution without driving off any material amount of acid.

4. The process which consists in treating a water insoluble aluminum bearing mineral decomposable by hydrofluosilicic or hydrofluoric acid, with a fluorine salt and sulphuric acid decomposing the fluorine salt to form a fluorine acid which causes decomposition of the aluminum bearing mineral, the treatment being carried out not above the boiling point of the batch.

5. The process which consists in treating an aluminum compound insoluble in water substantially undecomposable with sulphuric acid, with a fluorine salt in the presence of sulphuric acid decomposing the fluorine salt to form a fluorine acid which causes decomposition of the aluminum compound.

6. The process which consists in treating an aluminum bearing silicious compound insoluble in water with a fluorine salt in the presence of an acid decomposing the fluorine salt to form a fluorine acid which causes decomposition of the aluminum compound and the formation of an aluminum salt of said acids, the treatment being carried out in water solution without driving off any substantial amount of acid.

7. The process which consists in heating an aluminum bearing silicious compound substantially undecomposable with sulphuric acid, with a fluorine salt in the presence of sulphuric acid decomposing the fluorine salt to form a fluorine acid which causes decomposition of the aluminum salt and the formation of an aluminum salt of said acid, the aluminum salt being added in excess to render the resulting batch non-acid.

8. The process which consists in treating a water insoluble aluminum compound with water and a fluorine salt in the presence of sulphuric acid decomposing the fluorine salt to form a fluorine acid which causes decomposition of the aluminum salt, the aluminum salt being added in excess to render the resulting batch non-acid, the treatment being carried out not above the boiling point of the batch.

9. The process which consists in heating clay which is substantially undecomposable with sulphuric acid, with fluospar and sulphuric acid, causing the formation of a fluorine acid which decomposes the clay, and the formation of aluminum sulphate and fluoride.

10. The process which consists in heating clay which is substantially undecomposable with sulphuric acid, with calcium fluoride and sulphuric acid, causing the formation of a fluorine acid which decomposes the clay, and the formation of aluminum sulphate, the clay being added in excess.

11. The new composition comprising a water solution of aluminum sulphate and fluoride containing silicious material and calcium sulphate.

12. The new composition comprising a solution of an aluminum salt containing colloidal silicious material, and a salt of an alkaline earth metal.

13. The new composition comprising a solution of an aluminum salt containing gelatinous silicious material not in solution and a salt of an alkaline earth metal.

14. The new composition comprising a solution of an aluminum sulphate and some aluminum fluoride, the solution also containing silicious material, calcium sulphate and some clay.

15. The new composition comprising a solution of aluminum sulphate, the solution also containing gelatinous silicious material, calcium sulphate, and some clay.

16. The new composition containing aluminum sulphate, silicious material, a fluoride, calcium sulphate, and some clay.

17. The new composition containing an aluminum salt, silicious material, a fluoride, and a salt of an alkaline earth metal.

18. A new reaction product comprising a neutral solution containing aluminum sulphate, and an insoluble mud containing colloidal silica and clay.

19. The process which consists in treating an aluminum compound with sulphuric acid and a fluorine salt in a closed vessel.

20. The process which consists in treating an aluminum compound with sulphuric acid and a fluorine salt while subjecting the batch to heat and pressure.

21. The process which consists in treating unburned clay in a closed vessel with sulphuric acid and a fluorine salt, the reaction being carried out under pressure.

22. The process which consists in treating unburned clay in a closed vessel with sulphuric acid and a fluorine salt, the reaction being carried out under pressure, the unburned clay being present in quantities more than sufficient to decompose all of the sulphuric acid.

23. The process which consists in treating unburned clay with sulphuric acid and a fluorine salt, the unburned clay being present in quantities more than sufficient to decompose all of the sulphuric acid.

In testimony whereof, I have signed my name to this specification.

GEORG MUTH.